(12) United States Patent
Garg et al.

(10) Patent No.: US 11,627,218 B2
(45) Date of Patent: Apr. 11, 2023

(54) CALLER IDENTIFICATION INFORMATION ANALYZER

(71) Applicant: T-Mobile USA, Inc., Bellevue, WA (US)

(72) Inventors: Parag Garg, Woodinville, WA (US); Derrick Ives, North Bend, WA (US); Michele Lundahl, Yarrow Point, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/156,380

(22) Filed: Jan. 22, 2021

(65) Prior Publication Data

US 2022/0239773 A1  Jul. 28, 2022

(51) Int. Cl.
*H04M 3/42* (2006.01)
*H04M 3/22* (2006.01)

(52) U.S. Cl.
CPC ..... *H04M 3/42059* (2013.01); *H04M 3/2218* (2013.01); *H04M 3/42042* (2013.01); *H04M 3/42144* (2013.01)

(58) Field of Classification Search
USPC ........................................................ 455/415
See application file for complete search history.

(56) References Cited

U.S. PATENT DOCUMENTS

| | | | |
|---|---|---|---|
| 6,324,271 B1 | 11/2001 | Sawyer et al. | |
| 7,995,727 B1 | 8/2011 | Chmara et al. | |
| 8,040,875 B2 | 10/2011 | Barclay et al. | |
| 8,150,005 B1 | 4/2012 | Sayko et al. | |
| 8,204,047 B2 | 6/2012 | Rosenberg et al. | |
| 8,320,540 B2 | 11/2012 | Chen | |
| 8,787,542 B2 | 7/2014 | Farah et al. | |
| 9,001,985 B2 | 4/2015 | Cox et al. | |
| 9,060,057 B1 | 6/2015 | Danis | |
| 9,277,049 B1* | 3/2016 | Danis | H04M 3/54 |
| 10,659,602 B1* | 5/2020 | Cox | H04W 12/06 |
| 10,764,043 B2 | 9/2020 | Traynor et al. | |
| 2003/0148790 A1* | 8/2003 | Pappalardo | H04M 1/575 455/418 |
| 2017/0078466 A1* | 3/2017 | Yaung | H04W 12/043 |

\* cited by examiner

*Primary Examiner* — Amal S Zenati

(74) *Attorney, Agent, or Firm* — Han Santos, PLLC

(57) ABSTRACT

Methods, systems, and apparatus, including computer programs encoded on a computer storage medium, for implementing a caller identifier are disclosed. In one aspect, a method includes the actions of receiving, by a server and from a user of a computing device, data indicating a request to update a name that corresponds to a phone number in a caller identification information storage. The actions further include accessing, by the server, a calling history that indicates previous telephone calls of the phone number. The actions further include accessing, by the server, identification data of the user. The actions further include based on the calling history that indicates previous telephone calls of the phone number and the identification data of the user, determining whether to update the caller identification information storage to indicate that the name corresponds to the phone number.

20 Claims, 6 Drawing Sheets

300

Access historical data that includes past phone number and name pairs that are each labeled as accurate or inaccurate, past previous telephone calls from each past phone number, and past previous name changes of each past phone number
310

Train, using machine learning, a model that is configured to receive a given phone number and name pair, given previous telephone calls from the given phone number, and given previous name changes of the given phone number and output data indicating whether the given name is accurate or inaccurate for the given phone number
320

Receive a phone number and name pair, previous telephone calls from the phone number, and previous name changes of the phone number
330

Provide, as an input to the model, the phone number and name pair, the previous telephone calls from the phone number, and the previous name changes of the phone number
340

Receive, from the model, data indicating whether the name corresponds to the phone number
350

FIG. 3

CALLER IDENTIFICATION INFORMATION ANALYZER

BACKGROUND

Caller identification is a telephone service that transmits a caller's telephone number to the called party's telephone equipment when the call is being set up. The caller identification service may include the transmission of a name associated with the calling telephone number. The information received from the service may be displayed on a screen of the called party's telephone equipment or a separate screen.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 3 is a flowchart of an example process for training a model that is configured to determine whether to comply with a request to update caller identification information data.

DETAILED DESCRIPTION

Figure 1:
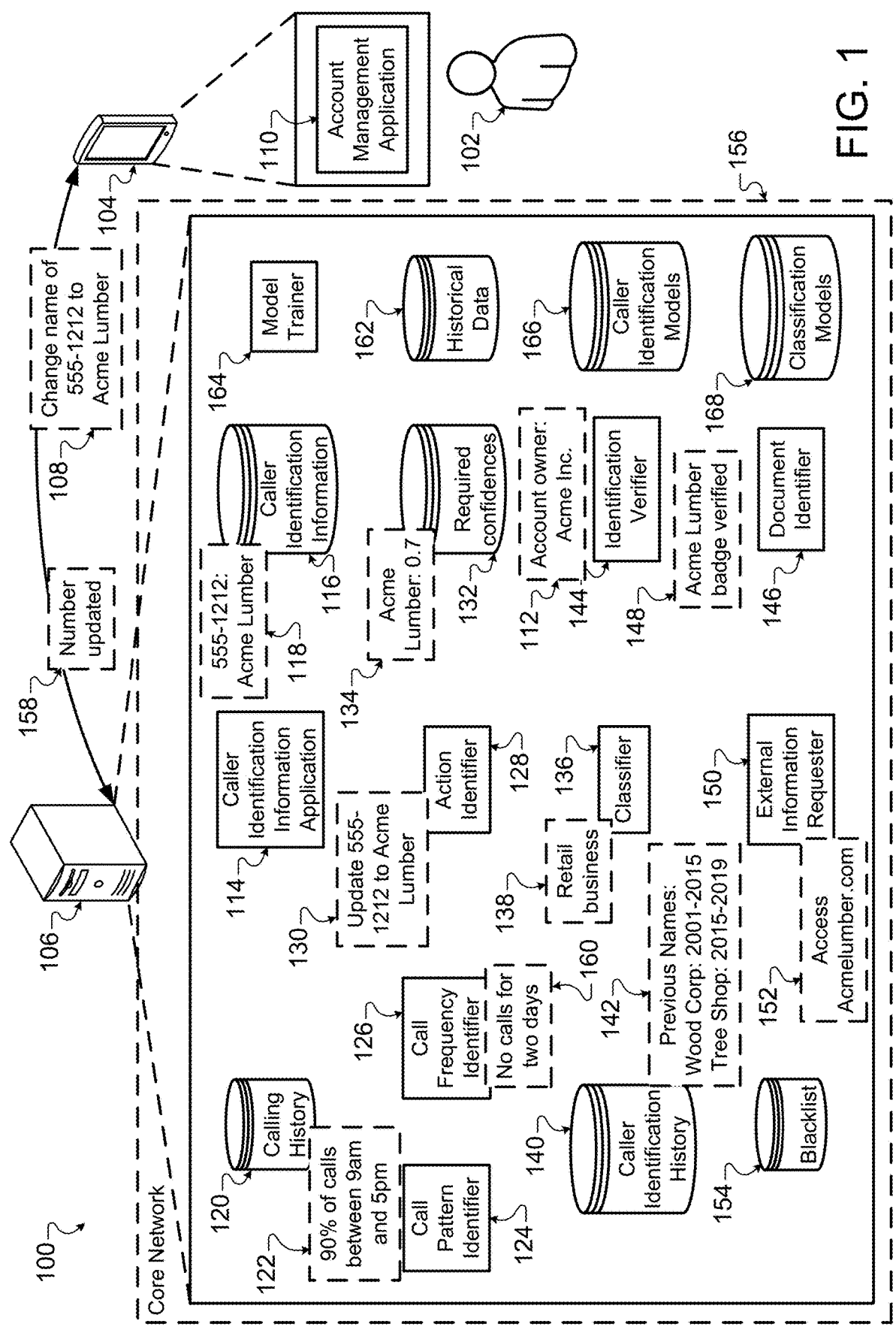
FIG. 1 illustrates an example system that is configured to receive a request to update caller identification information data and determine whether to comply with the request.

When a phone is ringing, displaying a caller identification name on that phone can involve accessing and receiving data from many different databases and entities. The caller's telephone service provider may maintain a database that includes phone numbers and associated names for the provider's customers. The called party's telephone service provider may maintain its own database for its customers. Also, third parties manage databases that telephone service providers may subscribe to and use to assign a caller identification name to a number.

In some instances, a service provider may allow a customer to change the name that is associated with the customer's number. In many instances, this improves the accuracy of the database. In a few instances, this may allow some customers to change the name to a false name. It would be beneficial to be able to verify entries in the caller identification database and provide an indication of that verification to a called party.

In order to verify the entries in a caller identification database, the manager of the database may take action at the time when a customer attempts to change an entry. In some instances, the database manager, wireless carrier, and/or other verification party may request a copy of a government-issued identification. If the customer changes their caller identification entry to a name that is similar to the name on the identification, then the manager may verify that entry. In some instances, the manager may use crowdsourcing to verify an updated entry. If several other customers have that number associated with a similar name in their personal phonebooks, then the manager may verify that entry. In some instances, the manager may assign different verification levels to different entries depending on the confidence that the update is accurate.

When a callee receives a call, the callee's carrier can provide a graphical (e.g., visual and/or audible) and/or tactile indication on the callee's phone that indicates whether the caller identification displayed on the callee's phone has been verified. This indication may provide the callee with confidence that the caller identification correctly identifies the caller.

In order to verify changes to the caller identification database, a manager of the database may employ several techniques. A first technique may involve comparing a proposed change to a blacklist of terms that cannot be used in the database. This may include profane terms and/or terms associated with fraudulent activity. A second technique may involve comparing the change to publicly accessible databases. If the number is associated with an entity or individual in a public directory, then the change may be accurate. A third technique may involve determining the context of the change and providing the context and the proposed change to a model. The model may output whether the change is likely accurate. The context may include the location of the device proposing the change, the date and time, the previous identification in the database, the time since the last change, the time since the last incoming and outgoing calls, the number and associated identity of the last incoming and outgoing calls, and/or any other information.

FIG. 1 illustrates an example system 100 that is configured to receive a request to update caller name information data and determine whether to comply with the request. Briefly, and as described in more detail below, the system 100 is configured to access, manage, update, and/or maintain the caller identification information storage. The system 100 may receive requests to update a name associated with a phone number in the caller identification information storage. The system 100 may access data related to a user 102 who is the subject of the update request, and historical data related to the phone number. Based on the data related to a user 102 and the historical data related to the phone number, the system 100 determines whether to update the caller identification information data as requested.

In more detail, the user 102 accesses an account management application 110 on the computing device 104. The computing device 104 may be any type of device that is configured to communicate with other devices through a wired and/or wireless connection. For example, the computing device 104 may be a mobile phone, laptop computer, tablet, desktop computer, television, smart device, and/or any other similar device. The account management application 110 may allow the user to manage a wireless carrier account of the computing device 104 and other computing devices on the wireless carrier account. The account management application 110 may allow the user 102 to view billing information, view data usage, view calling history, pay the wireless carrier account bill, and other account management actions. The account management application 110 may also allow the user 102 to manage the caller identification information for each of the phone numbers on the wireless carrier account.

By updating the caller identification information for each of the phone numbers on the wireless account, the user 102 can control what name appears on the recipient's phone when a telephone call is placed from one of the phones on the wireless carrier account. For example, if the caller information name is Alice for the phone number 555-1313, then the name Alice will appear on a recipient's phone when a user places a telephone call from the telephone with the number 555-1313. This may be the case unless the recipient's phone has the phone number 555-1313 and a name stored in the local contacts information.

In the example of FIG. 1, the user 102 accesses the account management application 110 of the computing device 104. The user 102 submits the name change request 108 to change the name of the phone number 555-1212 to Acme Lumber. The server 106 receives the name change request 108 and determines whether to update the caller identification information 116 to include Acme Lumber as the new name for the phone number 555-1212.

The server 106 may be included in or in communication with a network such as a wireless carrier network that provides voice and data communication services to multiple devices, such as the computing device 104 and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards. In some implementations, the server 106 may communicate with the computing device 104 and other devices using a Wi-Fi network, short range radio, infrared communication, and/or any other similar communication technique.

The wireless carrier network may include a radio access network and a core network 156. The radio access network may include multiple base stations. The multiple base stations are responsible for handling voice and/or data traffic between multiple devices, such as the computing device 104 and other devices and the core network 156. Accordingly, each of the base stations may provide a corresponding network cell that delivers telecommunication and data communication coverage. The core network 156 may use the network cells to provide communication services to the multiple subscriber devices. For example, the core network 156 may connect the multiple devices to other telecommunication and data communication networks, such as the Internet and the public switched telephone network (PSTN). The base stations are responsible handling voice and data traffic between devices and the core network 156. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send RF signals to devices and receive radio signals from devices.

The server 106 may include a caller identification information application 114 that receives the name change request 108 and accesses additional data to determine whether to comply with the name change request 108. The caller identification information application 114 may be implemented by one or more processors of the server 106. The server 106 may store the caller identification information 116 that includes the name and phone number pairs for the phone numbers of the wireless carrier network. In some implementations, the caller identification information 116 may be stored on another device that the server 106 accesses. In some implementations, the server 106 may periodically provide the caller identification information 116 to a third-party computing device so that the third-party computing device can update other caller information data with the data included in the caller identification information 116. In some cases, the server 106 may access the caller information data of the third-party computing device if the server 106 receives an incoming phone call in order to identify a name to display on a recipient's phone.

The caller identification information application 114 may access data from various sources to determine whether to comply with the name change request 108. In some cases, the caller identification information application 114 may access data from a subset of these sources and determine whether to comply with the name change request 108. If the caller identification information application 114 determines to comply with the name change request 108, then the caller identification information application 114 may update the name in the caller identification information 116. If the caller identification information application 114 determines not to comply with the name change request 108, then the caller identification information application 114 may notify the user 102 and/or store data indicating the attempted name change.

The caller identification information application 114 may access the calling history 120. The calling history 120 may store data indicating the previous incoming and outgoing calls of the phone number of the wireless carrier network. The calling history 120 may include calling data for placed telephone calls that includes the phone number called, the duration of the telephone call, whether the called party answered the telephone call, whether the telephone call went to voicemail, the time and date of the telephone call, and/or any other information. The calling history 120 may include calling data for received telephone calls that includes the phone number of the calling party, the duration of the telephone call, whether the called party answered the telephone call, whether the telephone call went to voicemail, the time and date of the telephone call, and/or any other information.

The server 106 may include a call pattern identifier 124. The call pattern identifier 124 may be implemented by one or more processors of the server 106. The call pattern identifier 124 may be configured to analyze the calling history 120 and identify any calling patterns. The calling patterns may include the time periods when a phone associated with a phone number typically places calls, the time periods when a phone associated with a phone number typically receives calls, a mean and median length of the telephone calls, whether the telephone calls are between a varying group of phone numbers or a limited group of phone numbers, and/or any other calling pattern. The call pattern identifier 124 may apply thresholds to determine these calling patterns. For example, the call pattern identifier 124 may determine the time periods when a phone associated with a phone number receives and/or places ninety percent of the phone calls. The call pattern identifier 124 may determine a percentage of telephone calls for the most common five numbers.

As illustrated in FIG. 1, the call pattern identifier 124 may analyze the calling history 120 for the phone number 555-1212. The call pattern identifier 124 may determine the pattern 122 for the phone number 555-1212. The pattern 122 may indicate that the phone number receives ninety percent of its telephone calls between the hours of 9 am and 5 pm. The call pattern identifier 124 may also determine that the most common five telephone numbers that call or are called by 555-1212 account for five percent of the total telephone calls.

The server 106 may include a call frequency identifier 126. The call frequency identifier 126 may be implemented by one or more processors of the server 106. The call frequency identifier 126 may be configured to determine the frequency that a phone associated with a phone number places and/or received telephone calls. The call frequency identifier 126 may determine an average frequency that a phone associated with a phone number places and/or received telephone calls on average, the last time that a phone associated with a phone number places and/or received a telephone call, the average frequency during a specific time period, and/or any other frequency.

As illustrated in FIG. 1, the call frequency identifier 126 may analyze the calling history 120 for the phone number 555-1212. The call frequency identifier 126 may determine the frequency 160 for the phone number 555-1212. The frequency 160 may indicate that the phone number 555-1212 has not received and/or placed a telephone call in two days. The call frequency identifier 126 may also determine an average frequency of the time period identified by the call pattern identifier 124. The call frequency identifier 126 may determine that the phone number 555-1212 receives and/or places a telephone call every five minutes on average between 9 am and 5 pm.

The caller identification information application 114 may access the caller identification history 140. The caller identification history 140 may be located in a memory storage device of the server 106. The caller identification history 140 may store the previous names associated with each phone number and the dates corresponding to each name. In some implementations, the caller identification history 140 may include data identifying a device that requested the name change and/or data identifying a user who requested the name change. In some implementations, the caller identification history 140 may include data identifying a location of the computing device that requested the name change.

As illustrated in FIG. 1, the caller identification history 140 may include history name data 142 for the number 555-1212. The history name data 142 may indicate that the name "Wood Corp" corresponded to the number 555-1212 during the time period of 2001-2015 and that the name "Tree Shop" corresponded to the number 555-1212 during the time period 2015-2019. The caller identification information application 114 may update the caller identification history 140 in response to updating the name of a number in the caller identification information 116.

The server 106 may include an external information requester 150. The external information requester 150 may be implemented by one or more processors of the server 106. The external information requester 150 may be configured to access external data related to the name change request 108. The external information requester 150 may identify data included in the name change request 108 and identify the user 102 who submitted the name change request 108. The external information requester 150 may access publicly accessible information related to the name included in the name change request 108. The external information requester 150 may access social media pages, websites, directories, and/or any other similar information. In some implementations, the external information requester 150 may attempt to access a website, directory, and/or other information that may require authentication. In this case, the external information requester 150 may request that the user 102 grant the server 106 access to the website, directory, and/or other information that require authentications.

By accessing external data related to the name change request 108, the external information requester 150 may attempt to gather information related to whether the user 102 is authorized to change the name of the number and whether the phone number is associated with the name in any public directories, webpages, and/or other similar sources. In the example of FIG. 1, the external information requester 150 may analyze the name change request 108 and identify the name "Acme Lumber." The external information requester 150 may attempt to access data related to Acme Lumber. The external information requester 150 may access a website of Acme Lumber and online directories that include contact information for Acme Lumber. The public directories, webpages, or other sources may list the number 555-1212 as a number for Acme Lumber. The external information requester 150 may identify the user 102 as the user providing the name change request 108. The external information requester 150 may access social media pages for the user 102 or other users and may identify the user 102 as an employee of Acme Lumber.

The server 106 may include a document identifier 146. The document identifier 146 may be implemented by one or more processors of the server 106. The document identifier 146 may be configured to analyze documents provided by the user 102 that the user 102 may submit that may indicate the user 102 is authorized to change the name of the number and/or authorized to use the name included in the name change request. The document identifier 146 may request that the user 102 submit an image of an identification document. The identification document may be a government identification, an employee badge, and or any other similar document. The document identifier 146 may be configured to analyze the image of the identification document and determine whether the identification document is authentic.

The document identifier 146 may be configured to identify documents in addition to identification documents. For example, the document identifier 146 may be able to authenticate other documents that may indicate the identity of the user. Some of those documents may include bills or other mail, licenses, and certificates that may include the name of the user 102 and/or the name included in the name change request 108. The document identifier 146 may be configured to request an image of the user 102. The document identifier 146 may request that the user 102 capture an image of the user 102 using a camera on the computing device 104. The document identifier 146 may compare this image to any documents that may include an image of a person to determine whether the user 102 is the person depicted on the identification document. In some instances, the document identifier 146 may be configured to distinguish genuine documents from fake documents. The document identifier 146 may analyze documents for security features such as holograms, security threads, microprint, and/or any other similar security feature.

The server 106 may include an identification verifier 144. The identification verifier 144 may be implemented by one or more processors of the server 106. The identification verifier 144 may coordinate with the document identifier 146 to determine the identities of various parties involved in the name change request 108. The identification verifier 144 may access the account information of the phone number included in the name change request 108. Based on the account information, the identification verifier 144 may determine an account owner of the phone number. The identification verifier 144 may request data related to an identity of the user 102. The identification verifier 144 may communicate with the document identifier 146 and the external information requester 150 to compare the image of the person depicted in the identification document, the image of the person depicted on a webpage operated by the account owner, and the image of the user 102 captured by a camera of the computing device 104. The identification verifier 144 may determine an identity of the user 102 based on that comparison. In some implementations, the identification verifier 144 may access data indicating a user who frequently interacts with the computing device 104. The identification verifier 144 may compare the data indicating a user who frequently interacts with the computing device 104 to the previously determined identity of the user 102 to further verify the identity of the user 102.

In some implementations, the identification verifier 144 may request additional information to determine the identity of the user 102. The identification verifier 144 may request prior phone numbers of the user 102. The identification verifier 144 may compare the accounts associated with those prior phone numbers and compare the data included in those accounts with the current account of the user 102. The identification verifier 144 may request home and/or work addresses of the user 102. The identification verifier 144 may compare those locations to usage patterns of the devices on the current account of the user 102 because the user 102 would likely be located at the home and/or work addresses during most days. This may be referred to as an activity fingerprint. The identification verifier 144 may request other locations where the user 102 frequently visits and compare those locations to the usage patterns of the devices on the current account of the user 102. The identification verifier 144 may request a unique identifier of the user 102 that the wireless carrier may use to identify the user 102.

In some implementations, the identification verifier 144 may request input from other parties. These parties may be family members, other people on the account of the user, other parties who have called and/or received calls from the user 102, and/or any other similar people. The identification verifier 144 may request input from those parties whose identity the identification verifier 144 has previously verified. The identification verifier 144 may request that the individual provide information on the identity of the user 102. In some implementations, the identification verifier 144 may request input from at least a threshold number of people.

In the example of FIG. 1, the identification verifier 144 may access account information for the phone number 555-1212. The account information may indicate that the account owner of the phone number 555-1212 is Acme Inc. The identification verifier 144 may compare the Acme Lumber badge verified by the document identifier 146 to the employee biographies included in the Acme Lumber webpage that the external information requester 150 accessed. Based on that comparison, the identification verifier 144 may determine that the user 102 is likely an employee of Acme Lumber.

The server 106 may include a classifier 136. The classifier 136 may be implemented by one or more processors of the server 106. The classifier 136 may be configured to assign a classification to a phone number based on the ownership of that phone number. The classification may relate to the type of user and/or entity that owns the phone number. Some example classifications may include retail business, industrial business, commercial business, personal user, government entity, and/or any other similar classification.

The classifier 136 may assign a classification to a phone number when the phone number is assigned to a customer of the wireless carrier. The classifier 136 may determine the classification based on data provided by the customer. In some implementations, the classifier 136 may request that the external information requester 150 access data related to the customer and the name selected by the customer. Based on the external data accessed by the external information requester 150, the classifier 136 may determine a classification for the phone number.

The classifier 136 may maintain the classification for a phone number while the ownership of the phone number remains unchanged. If the ownership of a phone number changes, then the classifier 136 may determine a new classification. The classifier 136 may store the classification for each phone number in the caller identification information 116. The caller identification information application 114 may use the classification of a phone number as a factor in determining whether to comply with the name change request 108. For example, if the classification of the phone number is a retail business and the name change request 108 specifies to change the name to "Alice," then the caller identification information application may use that classification as an indication that the name change request 108 should not be performed. As another example, if the classification of the phone number is a personal user and the name change request 108 specifies to change the name to "Alice," then the caller identification information application may use the classification as an indication that the name change request 108 should be performed.

In some implementations, the classifier 136 may pre-assign groups of phone numbers to a particular classification in advance of assigning a phone number to a customer. For example, the phone numbers 555-2xxx may be assigned to the retail business classification. The phone numbers 555-3xxx may be assigned to the personal user classification. The phone numbers 555-4xxx may be assigned to the government entity classification. When the wireless carrier assigns a phone number to a new customer, the wireless carrier may select a phone number from the group that matches the classification of the new customer. With pre-assigned classifications, a component of the server 106 or another computing device may be able to determine whether the name that corresponds to a phone number is correct if the component or other computing device is aware of the pre-assigned classification groups. The component or other computing device may not need access to the caller identification information 116 to determine the classification.

In the example of FIG. 1, the classifier 136 may determine the classification 138 of the phone number identified in the name change request 108 is retail business. The classifier 136 may access the caller identification information 116 that includes the classification for the number 555-1212. In some instance, the classifier 136 may determine the classification 138 based on phone numbers in the 555-1xxx family corresponding to a retail business.

The server 106 may include the required confidences 132 that are located in a memory storage of the server 106. The required confidences 132 may include a confidence threshold for various users and entities that the server 106 may require to perform the name change request 108. The caller identification information application 114 may determine a confidence threshold for an entity based on the type of entity. For example, the caller identification information application 114 may set the confidence threshold required to change the name to Department of Motor Vehicles may be 0.9 because the Department of Motor Vehicles is a government entity. The caller identification information application 114 may set the confidence threshold required to change the name to Pizza Palace to 0.7 because Pizza Palace is a commercial entity. Some confidence thresholds may correspond to types of names or classifications of names. For example, to change a name of a phone number to a person's name, the confidence threshold may be 0.6. In some implementations, an entity may require a particular confidence threshold. For example, the entity Taco Truck may request a confidence threshold of 0.8 in order to change the name of a phone number to Taco Truck.

If the caller identification information application 114 determines that the confidence score does not satisfy the confidence threshold, then the caller identification information application 114 may not comply with the name change request 108. If the caller identification information application 114 determines that the confidence score does not satisfy the confidence threshold, then the caller identification information application 114 may not comply with the name change request 108.

In the example of FIG. 1, the confidence threshold 134 for the name identified in the name change request 108, Acme Lumber, is 0.7. With a confidence threshold of 0.7, the caller identification information application 114 may comply with the name change request 108 if the caller name identification application 114 determines that the likelihood of the name Acme Number correctly corresponding to 555-1212 has a confidence score of 0.7 or higher. If the confidence score is below 0.7, then the caller name identification application 114 may determine that the name Acme Number does not likely correspond to the number 555-1212.

The server 106 may include a blacklist 154 that is located in a memory storage of the server 106. The blacklist 154 may include names that are prohibited in the caller identification information 116. The prohibited names may include those with profanity and/or any offensive names or terms. In some instances, the prohibited names may be updated based on input from a user. In some instances, the prohibited names may be updated based on accessing data from other computing devices that may provide data related to profanity and/or offensive terms.

In some implementations, the server 106 may include a whitelist and/or graylist. The whitelist and/or graylist may be included in a memory storage of the server 106. The whitelist may include names that are permitted in the caller identification information 116. These names may include personal names, such as, Alice, Bob, Charlie and other common business names such as company and corporation. The graylist may include names that may be questionable. The names in the graylist may include names that may have multiple meanings and/or vague. Some of those meanings may be offensive. Names in the graylist may be manually reviewed. After review, they may be placed in the whitelist or blacklist.

The server 106 may include an action identifier 128. The action identifier 128 may be implemented by one or more processors of the server 106. The action identifier 128 may be configured to determine whether to comply with the name change request 108 or not to comply with the name change request 108. The action identifier 128 may determine additional actions for the caller identification information application 114 to perform in response to the name change request 108. The additional actions may include requesting additional information from the user 102, requesting additional information from a person or entity identified in the name change request 108, and/or any other information. The additional information from the user 102 may include identifying documentation for the user. The additional information from the person or entity identified in the name change request 108 may include confirmation that the person or entity authorizes the name change.

In the example of FIG. 1, the action identifier 128 may determine to perform the action 130 of updating the name of the phone number 555-1212 to Acme Lumber. The action identifier 128 and the caller identification information application 114 may determine to perform this action based on pattern 122 indicating that ninety percent of the calls for this number occur between 9 am and 5 pm. The action identifier 128 may determine that those patterns suggest that the phone number belongs to a business. The action identifier 128 and the caller identification information application 114 may also analyze the name history data 142 that indicates the previous names of the number 555-1212. The action identifier 128 and the caller identification information application 114 may determine that "Wood Corp" and "Tree Shop" appear to be related to a business that deals with lumber. Based on that, the action identifier 128 and the caller identification information application 114 may determine that Acme Lumber is related to a lumber business, which suggests the name change request 108 should be implemented.

The action identifier 128 and the caller identification information application 114 may determine that the name change request 108 should be implemented based further on the document verification data 148 indicating that the user 102 presented a badge for Acme Lumber and the account owner data 122 indicating that Acme Inc is the owner of the account that includes the phone number 555-1212. The action identifier 128 and the caller identification information application 114 may analyze the call frequency data 160 indicating that the phone number 555-1212 has not had any telephone calls for two days. The action identifier 128 and the caller identification information application 114 may determine that the call frequency data 160 is inconclusive regarding whether the name change request 108 should be implemented.

Based on the data analyzed by the action identifier 128 and the caller identification information application 114, the confidence score indicating that the name change request 108 should be implemented may be 0.8. The action identifier 128 may compare the confidence score of 0.8 to the confidence threshold 134 of 0.7. Based on the confidence score being greater than the confidence threshold 134, the action identifier 128 performs the action 130 of updating the entry 118 in the caller identification information 116 so that Acme Lumber now corresponds to the number 555-1212. Based on updating the entry 118 in the caller identification information 116, the server 106 may transmit the confirmation 158 to the computing device 104 indicating that the server 106 complied with the name change request 108.

Figure 2:
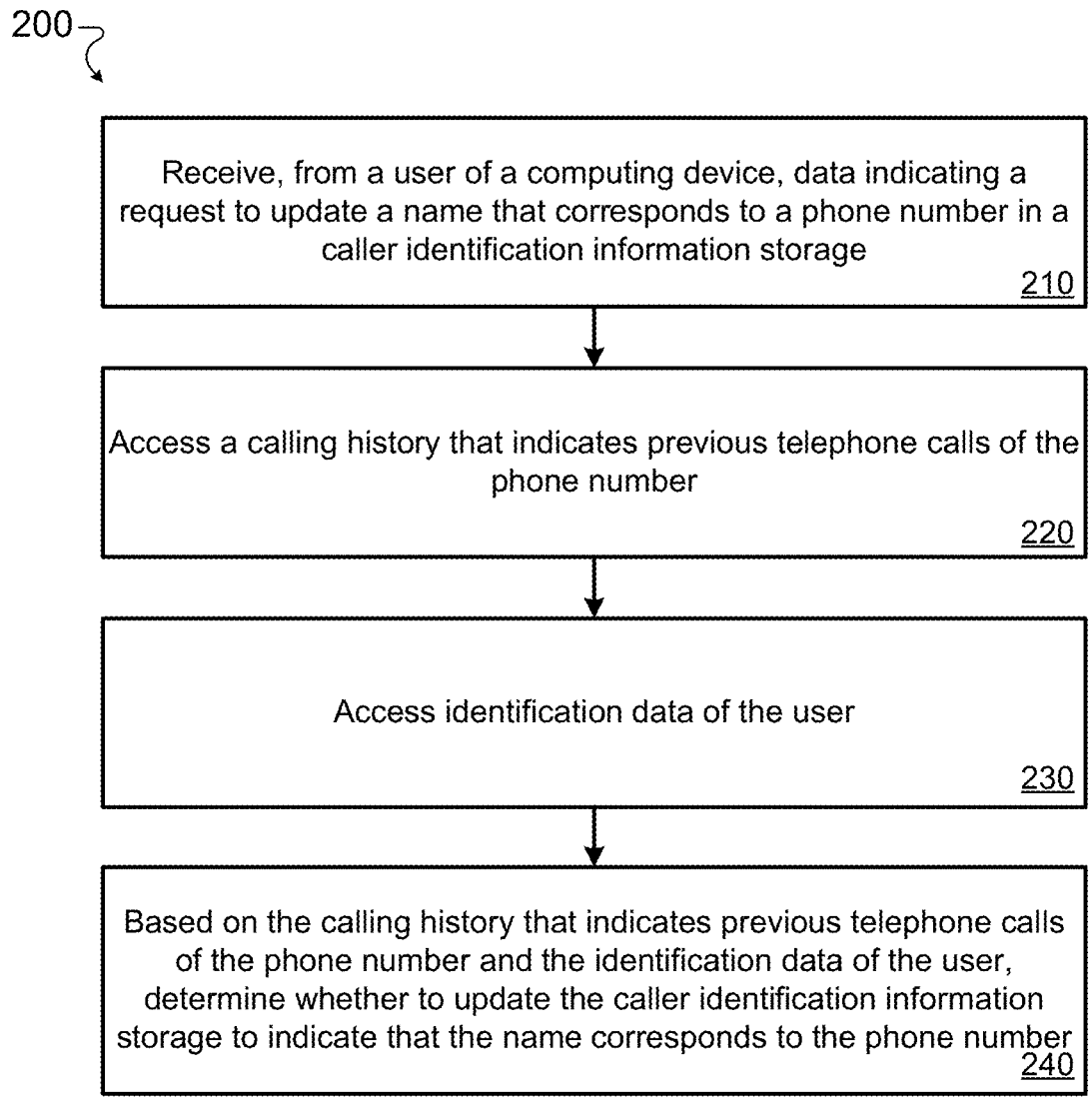
FIG. 2 is a flowchart of an example process for receiving a request to update a caller identification information data and determine whether to comply with the request.

FIG. 2 is a flowchart of an example process 200 for receiving a request to update a caller identification information data and determine whether to comply with the request. In general, the process 200 receives a request to update caller identification information data of a telephone number. The process 200 accesses the calling history of that telephone number and information on the user making the request. Based on at least those factors, the process 200 determines whether to comply with the request. The process 200 will be described as being performed by the server 106 of FIG. 1 and will include references to other components in FIG. 1.

The server 106 receives, from a user 102 of a computing device 104, data indicating a request 108 to update a name that corresponds to a phone number in a caller identification information storage (210). The user 102 interacts with an account management application 110 that is running on the computing device 104. The account management application 110 may allow the user 102 to perform various account management tasks for each of the phones on an account. The user 102 may provide a name change request 108 to update the name for a phone number on the account. The user 102 may be the account holder or acting on behalf of the account holder. In some instances, the user 102 may be attempting to submit an improper name change request. An improper name change request may be one that is fraudulent and/or where the name in the name change request 108 does not reflect the person or entity that operates the phone number.

The server 106 accesses a calling history 120 that indicates previous telephone calls of the phone number (220). The server 106 may include or have access to a calling history 120 that stores the calling data from previous calls made to and from various phone numbers that have wireless carrier service with the wireless carrier that manages the server 106. The calling history 120 may include data indicating the date and time of each call, the length of each call, whether the call was an incoming or outgoing call, whether the call went to voicemail, and/or any other information.

The server 106 may include a calling pattern identifier 124 that is configured to determine time periods that devices that correspond to the phone number in the name change request 108 have previously placed and received telephone calls. The calling pattern identifier 124 may determine the time periods and days of the week when the phone number placed and/or received a threshold percentage of the phone calls. The calling pattern identifier 124 may determine the minimum time periods to reach the threshold percentage of phone calls. For example, the calling pattern identifier 124 may determine the time periods and days of the week when the phone number placed and/or received ninety percent of the telephone calls. The calling pattern identifier 124 may determine that ninety percent of the telephone calls were placed and/or received during 9 am and 5 pm on Monday through Friday.

The server may include a call frequency identifier 126 that is configured to determine an amount of time that has elapsed since a device that corresponds to the phone number in the name change request 108 has placed and/or received a telephone call. The call frequency identifier 126 may determine that the phone number has not received and/or placed a telephone call in two days. In some instances, the amount of time since a telephone number has placed and/or received a telephone call may be a sign of a change in usage of the phone number. A telephone number that has not been used for longer than a threshold period of time, such as two weeks, may be more likely to be associated with a name change. This may occur because the phone number is not assigned to an account and is waiting to be reassigned or because the operator of the number is adjusting how the operator will be using the phone number.

The server 106 accesses identification data of the user 102 (230). In some implementations, the server 106 may request the identification data from the user 102. The identification data of the user may include an identification document of the user 102, social media content of the user, an image of the user, and/or any other information. The server 106 may include a document identifier 146 that is configured to analyze documents received from the user 102. The documents may include identification documents and/or any other documents that the user 102 may provide to indicate that the user 102 is the person identified in the name change request 108 and/or is authorized to act for the person identified in the name change request 108.

The server 106 may include an external information requester 150. The external information requester 150 may be configured to access public data that is related to the person or entity identified in the name change request 108 and/or the user 102. The external information requester 150 may access websites of an entity or person, social media pages of a person or entity, and/or any other publicly accessible information.

In some implementations, the server 106 may include caller identification history data 140 that includes the history of the names associated with the phone numbers managed by the server 106. The caller identification history data 140 may include date ranges when each name corresponded to each phone number. In some implementations, the caller identification history data 140 may include data identifying periods when a phone number was unassigned.

In some implementations, the server 106 determines a location of the computing device 104 that submits the name change request 108. In some implementations, the server 106 may request the location of the computing device 104 from the computing device 104. In some implementations, the server 106 may include a mobility manager that is configured to determine the location of the computing device 104 in instances where the computing device 104 is communicating with a wireless carrier network of the server 106.

Based on the calling history that indicates previous telephone calls of the phone number and the identification data of the user, the server 106 determines whether to update the caller identification information storage to indicate that the name corresponds to the phone number (240). In some implementations, the server 106 determines to update the caller identification information storage to indicate that the name corresponds to the phone number. In this case, the server 106 changes the name that is associated with that phone number to the name in the name change request 108. In some implementations, the server 106 determines to bypass to update the caller identification information storage to indicate that the name corresponds to the phone number. In this case, the server 106 bypasses changing the name that is associated with the phone number to the name in the name change request 108 and maintains the name that is associated with the phone number. In some implementations, the server 106 may store data indicating the denied name change request 108.

In some implementations, the server 106 determines a confidence score based on the calling history, the identification data, the time period since the phone number placed and/or received a telephone call, the time periods that the phone number placed and/or received a percentage of telephone calls, the previous names associated with the phone number, and/or any other similar information. The confidence score may reflect a likelihood that the name included in the name change request 108 is an accurate reflection of the actual party associated with the phone number. The server 106 may compare the confidence score to a confidence threshold. If the confidence score satisfies a confidence threshold, then the server 106 complies with the name change request 108. If the confidence score does not satisfy the confidence threshold, then the server 106 rejects the name change request 108. In some implementations, different people and/or entities may have different confidence thresholds. For example, changing the name of a phone number to the Internal Revenue Service may have a confidence threshold of 0.9. Changing the name of a phone number to a person's name may have a confidence threshold of 0.6.

In some implementations, the server 106 may include data identifying that the name associated with a phone number in the caller identification information storage has been verified. A verified name may be one where the server 106 determined a confidence score above a verified confidence threshold. The verified confidence threshold may indicate a higher confidence than the confidence threshold required to comply with the name change request 108. For example, if the server 106 determines a confidence score for the name change request 108 is 0.97 and the verified confidence threshold is 0.95, then the server 106 may include data indicating that the name has been verified. When a call is placed from this number, the server 106 may include, in a notification provided to the callee device, data indicating that the name has been verified. In some implementations, the notification may be a session initiation protocol (SIP) invite, and the server 106 may include the data indicating that the name has been verified in the SIP invite. A verification icon may appear on the recipient's phone while the recipient's phone is ringing.

In some implementations, the server 106 may include a blacklist 154. The server 106 may compare the name in the name change request 108 to a blacklist 154. If the name in the name change request 108 matches a term in the blacklist 154, then the server 106 may not comply with the name change request 108. If the name in the name change request 108 does not match a term in the blacklist 154, then the server 106 may analyze additional data to determine whether to comply with the name change request 108.

In some implementations, the determination by the server 106 may be inconclusive. In this case, the server 106 may be unable to determine whether to update the caller identification information storage to indicate that the name corresponds to the phone number. In this case, the server 106 may request additional information from the user and/or notify a representative of the wireless carrier. The server 106 may request that the representative gather additional information. Based on that additional information, the representative can provide information to determine whether to update the caller identification information storage to indicate that the name corresponds to the phone number. The representative may request that the user visit a physical store of the wireless carrier to provide documentation, such as government identification, biometric information, and/or any other information to help determine whether to update the caller identification information storage to indicate that the name corresponds to the phone number.

In some implementations, the server 106 may use crowdsourcing to determine whether to update the caller identification information storage to indicate that the name corresponds to the phone number. This may involve accessing address books, calling patterns, and/or communication histories of other users. These users may be selected from previously verified users. For example, if other users have the name of the updated caller identification information in their contact information, then the server 106 may be more likely to update the caller identification information storage to indicate that the name corresponds to the phone number.

In some implementations, the server 106 may request permission from the other users to access this information.

FIG. 3 is a flowchart of an example process 300 for training a model that is configured to determine whether to comply with a request to update caller identification information data. In general, the process 300 accesses historical data related to caller identification information data that includes data indicating whether each name assigned to each phone number is correct and additional data. The process 300 trains a model that is configured to receive a proposed name change to a phone number in the caller identification information data. The process 300 uses the model to determine whether the proposed name change is a correct name change for that number. The process 300 will be described as being performed by the server 106 of FIG. 1 and will include references to other components in FIG. 1.

The server 106 accesses historical data 162 that includes past phone number and name pairs that are each labeled as accurate or inaccurate, past previous telephone calls from each past phone number, and past previous name changes of each past phone number (310). The historical data 162 may include the data collected and generated by the server 106 and other computing devices that manage other caller identification information at the time that the server 106 and the other computing devices determined whether to comply with the name change request. For example, the historical data 162 may include data analyzed by the call pattern identifier 124, the call frequency identifier 126, the classifier 136, the identification verifier 144, the external information requester 150, the document identifier 146, the name in the name change request, the telephone number, and/or any other similar components of the server 106. The historical data 162 may include previous data accessed from the caller identification history 140, the calling history 120, the required confidences 132, and/or any other similar data storage. The historical data 162 may also include a label indicating whether the name was an accurate reflection of the entity or the person associated with the phone number. The server 106 may determine the label based on feedback from users who receive phone calls from various number and indicate during or after the telephone call whether the name of the caller identification was an accurate reflection of the person or entity that called.

The server 106 includes a model trainer 164 that trains, using machine learning, a model that is configured to receive a given phone number and name pair, given previous telephone calls from the given phone number, and given previous name changes of the given phone number and output data indicating whether the given name is accurate or inaccurate for the given phone number (320). The model trainer 164 may be configured to generate data samples that each include the data that the server 106 or other computing device analyzed when determining whether to comply with the name change request. Each of the data samples may include different types of data depending on what the server 106 or the other computing device received. For example, some data samples may include data from the identification verifier 144 and other data samples may not include data from the identification verifier 144. This may be the case if the user provided no identification documents.

The model trainer 164 may train a model using machine learning and the data samples that each include the same type of data. For example, the model trainer 164 may train a model using data samples that includes data from the call pattern identifier 124 and data from the call frequency identifier 126. These data samples may also include a label indicating whether the name was an accurate reflection of the entity or the person associated with the phone number. The resulting model may be configured to receive data generated by the call pattern identifier 124 and the call frequency identifier 126. The model may be configured to output data indicating whether the model trainer 164 should comply with the name change request. In some implementations, the data samples may include the telephone number and/or the name in the name change request. In this case, the resulting model may be configured to receive the telephone number and/or the name in the name change request in addition to data similar to the other data in the data samples.

The server 106 receives a phone number and name pair, previous telephone calls from the phone number, and previous name changes of the phone number (330). The server 106 may store the trained models in the caller identification models 166 and select a model in response to receiving a name change request. The server 106 may attempt to access data from the call pattern identifier 124, the call frequency identifier 126, the classifier 136, the identification verifier 144, the external information requester 150, and/or the document identifier 146. The server 106 may also attempt to access the caller identification history 140, the calling history 120, and the required confidences 132. Even if the server 106 attempts to access data from each of the components and storage devices, the server 106 may receive data from a subset of them. Based on the data received, the server 106 may select a model that is configured to receive the corresponding data.

The server 106 provides, as an input to the model, the phone number and name pair, the previous telephone calls from the phone number, and the previous name changes of the phone number (340). The server 106 receives, from the model, data indicating whether the name corresponds to the phone number (350). Based on the data indicating whether the name corresponds to the phone number, the server 106 determines whether to comply with the name change request 108. If the model outputs data indicating that the name corresponds to the phone number, then the server 106 complies with the request. If the model outputs data indicating that the name does not correspond to the phone number, then the server 106 rejects the request.

In some implementations, the model may output a confidence score indicating a likelihood that the name corresponds to the phone number. In this case, the server 106 may compare the confidence score to a confidence threshold. If the confidence score satisfies the confidence threshold, then the server 106 complies with the request. If the confidence score does not satisfy the confidence threshold, then the server 106 denies the request.

If the server 106 complies with the request, then the server 106 may update the caller name identification to include the new name for the phone number. The server 106 may provide data to the requesting device indicating that the name is updated. In some implementations, the model may indicate to not comply with the request. In this case, the server 106 may provide data indicating that the user 102 may provide additional information that indicates that the new name is accurate for the phone number. The user 102 may provide additional information, and the server 106 may select a new model that is configured to receive the additional information in addition to the information provided to the initial model. The server 106 may determine whether to comply with the name change request based on the output from the new model.

Figure 4:
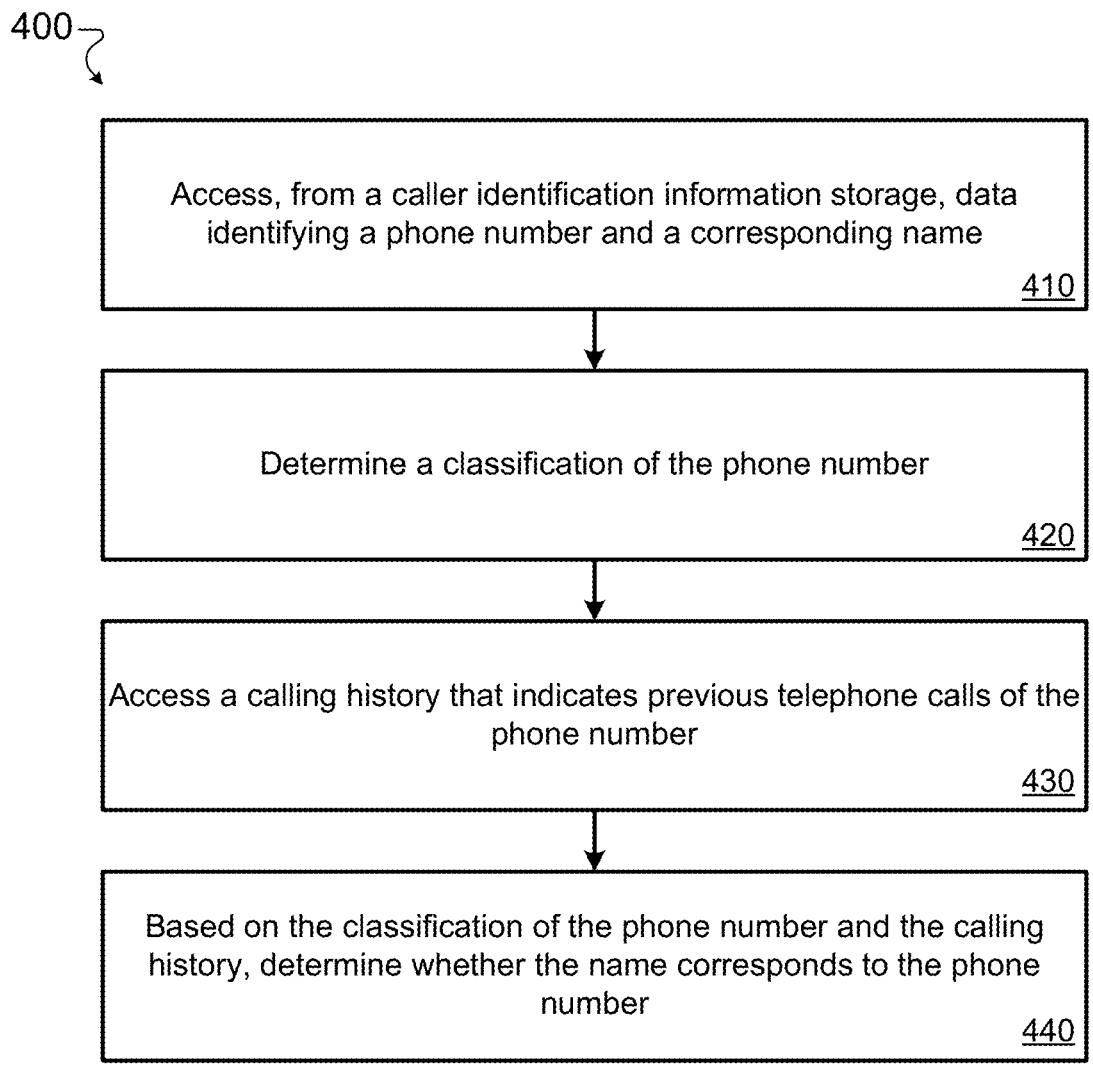
FIG. 4 is a flowchart of an example process for classifying a phone number and using that classification to determine whether the name in the caller identification information data matches the phone number.

FIG. 4 is a flowchart of an example process 400 for classifying a phone number and using that classification to determine whether the name in the caller identification information data matches the phone number. In general, the process 400 reviews the caller identification information data to determine if there are any names that are not correctly paired with a phone number. The process 400 may use the classification of the phone number and the history of the phone number to determine whether the name that corresponds to a phone number is correct. The process 300 will be described as being performed by the server 106 of FIG. 1 and will include references to other components in FIG. 1.

The server 106 accesses, from a caller identification information storage 116, data identifying a phone number and a corresponding name (410). The server 106 may access the caller identification information storage 116 periodically to verify that the phone numbers are paired with the correct names. In some instances, a user or other entity may have changed the name of a phone number to a name that does not properly reflect the person or entity associated with that phone number. By periodically reviewing the caller identification information storage 116, the server 106 may identify potential errors. In some cases, the server 106 may determine to verify a name and phone number pair based on the activity related to the phone number changing by at least a threshold percentage. For example, if the average number of calls placed or received from a phone number changes by a threshold percentage, then the server 106 may determine to verify that name and phone number pair.

The server 106 determines a classification of the phone number (420). In some instances, a phone number may be assigned a classification. The classification may reflect the type of person or entity whose name corresponds to the phone number. Some example classifications may include personal user, retail business, commercial business, industrial business, government entity, and/or any other similar classification. The server 106 may assign a classification to a number before the phone number is assigned to a customer. In this case, the server 106 may select a phone number for a new customer based on the phone number having a classification that matches the new customer. In some implementations, the server 106 may assign a classification to a phone number when assigning that phone number to a new or existing customer. The assigned classification may be based on characteristics of the new or existing customer. The assigned classification may match those classification of other phone numbers belonging to that customer.

The server 106 accesses a calling history that indicates previous telephone calls of the phone number (430). The server 106 may include or have access to a calling history 120 that stores the calling data from previous calls made to and from various phone numbers that have wireless carrier service with the wireless carrier that manages the server 106. The calling history 120 may include data indicating the date and time of each call, the length of each call, whether the call was an incoming or outgoing call, whether the call went to voicemail, and/or any other similar information.

The server 106 may include a calling pattern identifier 124 that is configured to determine time periods that devices that correspond to the phone number in the name change request 108 have previously placed and received telephone calls. The calling pattern identifier 124 may determine the time periods and days of the week when the phone number placed and/or received a threshold percentage of the phone calls. The calling pattern identifier 124 may determine the minimum time periods to reach the threshold percentage of phone calls. For example, the calling pattern identifier 124 may determine the time periods and days of the week when the phone number placed and/or received ninety percent of the telephone calls. The calling pattern identifier 124 may determine that ninety percent of the telephone calls were placed and/or received during 9 am and 5 pm on Monday through Friday.

The server may include a call frequency identifier 126 that is configured to determine an amount of time that has elapsed since a device with that corresponds to the phone number in the name change request 108 has placed and/or received a telephone call. The call frequency identifier 126 may determine that the phone number has not received and/or placed a telephone call in two days. In some instances, the amount of time since a telephone number has placed and/or received a telephone call may be a sign of a change in usage of the phone number. A telephone number that has not been used for longer than a threshold period of time, such as two weeks, may be more likely to be associated with a name change. This may occur because the phone number is not assigned to an account and is waiting to be reassigned or because the operator of the number is adjusting how the operator will be using the phone number.

Based on the classification of the phone number and the calling history, the server 106 determines whether the name corresponds to the phone number (440). In some implementations, the server 106 may determine a classification based on the calling history. In this case, different types of customers may exhibit different calling patterns, and the server 106 determines a likely classification based on the calling patterns in the calling history. In some implementations, the server 106 may use the classification models 168 that are configured to receive the calling history and output data indicating a classification for the corresponding phone number. The classification models 168 may be artificial intelligence models that are trained using machine learning and labeled classification data. The server 106 may compare the classification that corresponds to the calling history to the classification assigned to the phone number. If the two classifications match, then the server 106 may determine that the name is correct for the phone number. If the two classifications do not match, then the server 106 may determine that the name is not correct. In this case, the server 106 may contact an owner of the phone number for additional information regarding the proper name for the number. In some instances, the server 106 may also attempt to contact and receive information from the name of the person or entity paired with the phone number.

Figure 5:
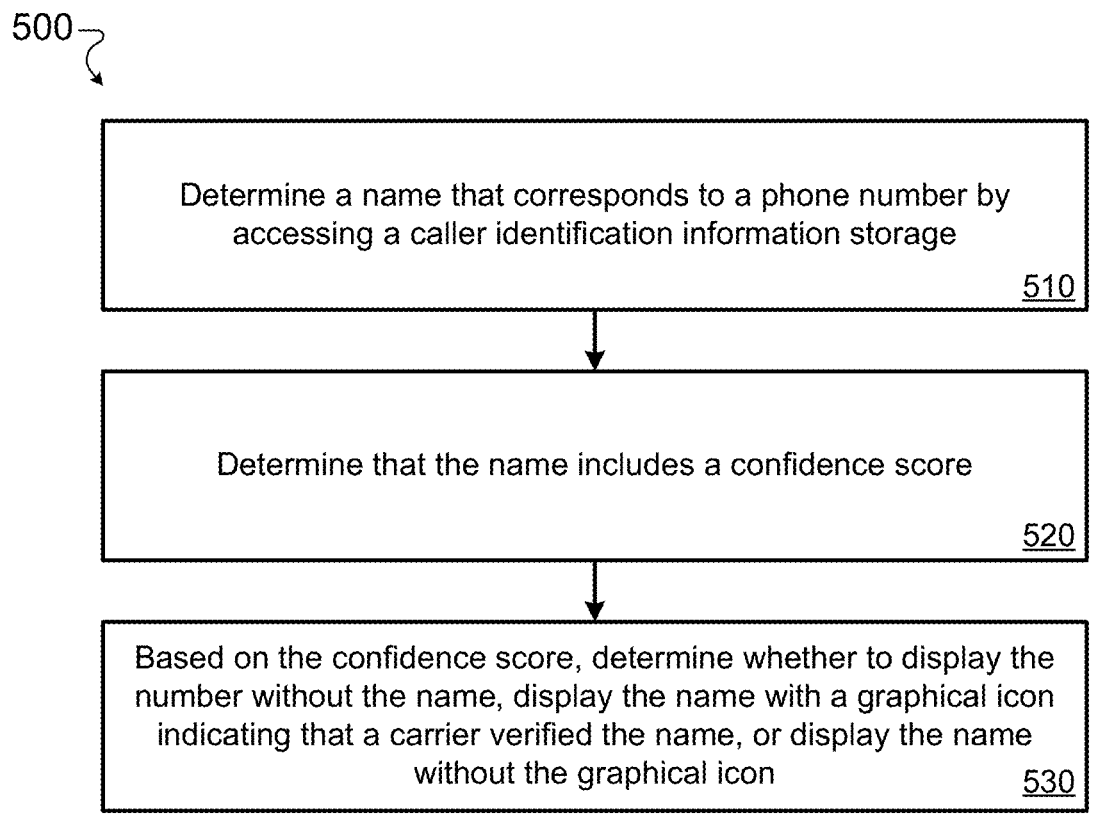
FIG. 5 is a flowchart of an example process providing a visual indicator to a recipient of a phone call regarding the likelihood that the displayed caller identification information is correct.

FIG. 5 is a flowchart of an example process 500 providing a visual indicator to a recipient of a phone call regarding the likelihood that the displayed caller identification information is correct. In general, the process 500 determines a confidence score for a name and phone number pair in caller identification information data. The process 500 may store that confidence score in the caller identification information data. When a telephone call is placed, the process 500 outputs a graphical (e.g., visual and/or audible) and/or tactile indication of the confidence score to the recipient of the telephone call. The process 500 will be described as being performed by the server 106 of FIG. 1 and will include references to other components in FIG. 1.

The server 106 determines a name that corresponds to a phone number by accessing a caller identification information storage (510). In this case, the server 106 receives an incoming call from a phone number and attempts to determine a corresponding name for the phone number by accessing the caller identification information 116. The server 106 determines that the caller identification information 116 includes a name for the phone number. For example, the server 106 may receive a telephone call from the number 555-9876. Before ringing the recipient's phone, the server 106 accesses the caller identification information 116 and determines that the corresponding name is "Callie Field."

The server 106 determines that the name includes a confidence score (520). The caller identification information 116 may include the confidence score with the name and phone number pair. The confidence score may reflect a likelihood that the name is an accurate representation of the person or entity associated with the phone number. In some implementations, each name and phone number pair may not include a confidence score. In some implementations, the server 106 may determine the confidence score in response to receiving the telephone call. In this case, the server 106 may determine that the confidence score is 0.95.

Based on the confidence score, the server 106 determines whether to display the number without the name, display the name with, e.g., a graphical icon (or other indication) indicating that a carrier verified the name, or display the name without the graphical icon (530). The server 106 may compare the confidence score to various ranges. Depending on the range that the confidence score falls into, the server 106 may present different information on the recipient's telephone.

If the confidence score falls within a low range, such as below 0.4, then the server 106 may determine to display the phone number without the name included in the caller identification information 116. If the confidence score falls within a middle range, such as between 0.4 and 0.9, then the server 106 may determine to display the name included in the caller identification information 116, and optionally, the phone number. If the confidence score falls within a high range, such as above 0.9, then the server may determine to display the name included in the caller identification information 116 and, e.g., a graphical icon (or other indication) that indicates a high confidence that the name is correct. In some instances, a confidence score may be in the high range if the server 106 previously verified that the name corresponds to the phone number.

Based on this determination, the server 106 may update the notification provided to the recipient's phone. If the confidence score falls within a low range, the server 106 may not include or remove the name included in the caller identification information 116 from the notification. If the confidence score falls within a middle range, then the server 106 may include the name included in the caller identification information 116 in the notification. If the confidence score falls within a high range, then the server may include the name included in the caller identification information 116 and a verified icon or link to a verified icon in the notification. The verified icon may appear on the recipient's phone when the recipient's phone is ringing. In some implementations, the notification may be a SIP invite.

In some implementations, the server 106 can update a contact list or address book of the user 102 to include the confidence score. The contact list or address book may be on the computing device 104 or another computing device. The server 106 may determine whether the contact list includes the phone number for which the server 106 determined the confidence score. If the contact list includes the phone number, then the server 106 may compare the name in the contact list to the name in the caller identification information storage. If the name is the same or similar, then the server 106 may include the confidence score in the contact list entry. When the computing device 104 receives a phone call from that number, then computing device 104 may present a graphic or output another indication of the confidence score. In some implementations, the server 106 may request permission from the user 102 to update the contact list to include the confidence score.

Figure 6:
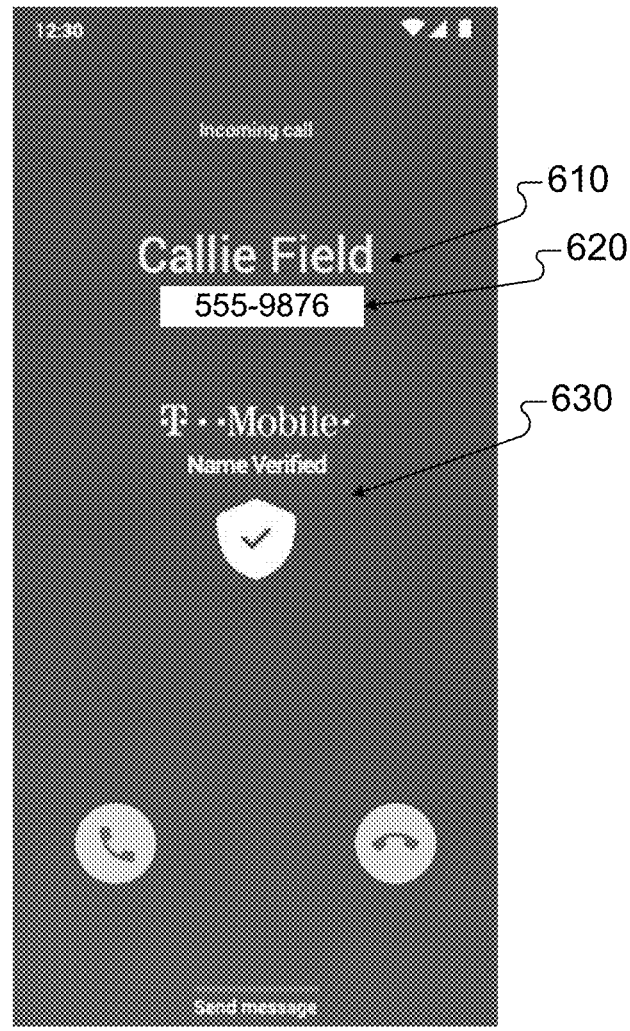
FIG. 6 illustrates an example interface of a phone receiving a telephone call from a number with a verified caller identification name.

FIG. 6 illustrates an example interface 600 of a phone receiving a telephone call from a number with a verified caller identification name. The interface 600 includes the caller's name 610 and the caller's phone number 620. The interface also includes a verified icon 630 that indicates that the wireless carrier has verified that the caller's name 610 is accurate. The recipient can answer the telephone call with confidence that Callie Field is calling.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   receiving, by a server and from a user of a computing device, data indicating a request to change a current name that corresponds to a phone number in a caller identification information storage from the current name to a new name, wherein the caller identification information storage is configured to (i) receive a given phone number of a given calling phone during placement of a given telephone call from the given calling phone to a given callee phone and (ii) output a given name that corresponds to the given phone number of the given calling phone for the given callee phone to output, based on given contacts information associated with the given callee phone not including given name data for the given phone number, on a given display while the given callee phone is outputting a given notification of the given telephone call;
   accessing, by the server, a calling history that indicates previous telephone calls placed from the phone number;
   accessing, by the server, identification data of the user;
   based on the calling history that indicates previous telephone calls placed from the phone number and the identification data of the user, determining whether to change the current name that corresponds to the phone number in the caller identification information storage from the current name to the new name;
   receiving, by the server, data indicating placement of a telephone call from the phone number to a callee phone;
   in response to receiving the data indicating placement of the telephone call from the phone number, identifying, by the server, a name that corresponds to the phone number and that is the current name or the new name by accessing the caller identification information storage; and
   providing, for output by the server and to the callee phone, (i) data indicating a notification of the telephone call and (ii) the name that is the current name or the new name and data indicating that the name corresponds to the phone number.

2. The method of claim 1, wherein:
   determining whether to change the current name that corresponds to the phone number in the caller identification information storage from the current name to the new name comprises determining to change the current name that corresponds to the phone number to the new name, and
   the method comprises changing the current name that corresponds to the phone number to the new name.

3. The method of claim 2, comprising:
   based on the calling history that indicates previous telephone calls from the phone number and the identification data of the user, updating the caller identification information storage to include data indicating that the server verified the new name.

4. The method of claim 1, wherein:
   determining whether to change the current name that corresponds to the phone number in the caller identification information storage from the current name to the new name comprises determining to bypass changing the current name that corresponds to the phone number to the new name, and
   the method comprises providing, for output to the computing device, data indicating that the server will not change the current name that corresponds to the phone number to the new name.

5. The method of claim 1, comprising:
   determining, by the server, a confidence value that indicates the phone number belongs to the new name;
   determining, by the server, a threshold confidence value for the new name; and
   comparing the threshold confidence value to the confidence value,
   wherein determining whether to change the current name that corresponds to the phone number in the caller identification information storage from the current name to the new name is based on comparing the threshold confidence value to the confidence value.

6. The method of claim 1, comprising:
   determining time periods that devices that correspond to the phone number have previously placed telephone calls,
   wherein determining whether to change the current name that corresponds to the phone number in the caller identification information storage from the current name to the new name is based on the time periods that devices that correspond to the phone number have previously placed telephone calls.

7. The method of claim 1, comprising:
   determining an amount of time that has elapsed since a device that corresponds to the phone number has previously placed a telephone call,
   wherein determining whether to change the current name that corresponds to the phone number in the caller identification information storage from the current name to the new name is based on the amount of time that has elapsed since a device that corresponds to the phone number has previously placed a telephone call.

8. The method of claim 1, comprising:
   determining previous names that have corresponded to the phone number,
   wherein determining whether to change the current name that corresponds to the phone number in the caller identification information storage from the current name to the new name is based on the previous names that have corresponded to the phone number.

9. The method of claim 1, wherein the identification data of the user comprises:
   an identification document;
   social media content of the user; or
   an image of the user.

10. The method of claim 1, comprising:
comparing the name to a blacklist,
wherein determining whether to change the current name that corresponds to the phone number in the caller identification information storage from the current name to the new name is based on comparing the name to the blacklist.

11. The method of claim 1, comprising:
determining a location of the computing device,
wherein determining whether to change the current name that corresponds to the phone number in the caller identification information storage from the current name to the new name is based on the location of the computing device.

12. A system, comprising:
one or more processors; and
memory including a plurality of computer-executable components that are executable by the one or more processors to perform a plurality of actions, the plurality of actions comprising:
  receiving, by a server and from a user of a computing device, data indicating a request to change a current name that corresponds to a phone number in a caller identification information storage from the current name to a new name, wherein the caller identification information storage is configured to (i) receive a given phone number of a given calling phone during placement of a given telephone call from the given calling phone to a given callee phone and (ii) output a given name that corresponds to the given phone number of the given calling phone for the given callee phone to output, based on given contacts information associated with the given callee phone not including given name data for the given phone number, on a given display while the given callee phone is outputting a given notification of the given telephone call;
  accessing, by the server, a calling history that indicates previous telephone calls placed from the phone number;
  accessing, by the server, identification data of the user;
  based on the calling history that indicates previous telephone calls placed from the phone number and the identification data of the user, determining whether to change the current name that corresponds to the phone number in the caller identification information storage from the current name to the new name;
  receiving, by the server, data indicating placement of a telephone call from the phone number to a callee phone;
  in response to receiving the data indicating placement of the telephone call from the phone number, identifying, by the server, a name that corresponds to the phone number and that is the current name or the new name by accessing the caller identification information storage; and
  providing, for output by the server and to the callee phone, (i) data indicating a notification of the telephone call and (ii) the name that is the current name or the new name and data indicating that the name corresponds to the phone number.

13. The system of claim 12, wherein:
determining whether to change the current name that corresponds to the phone number in the caller identification information storage from the current name to the new name comprises determining to change the current name that corresponds to the phone number to the new name, and
the method comprises changing the current name that corresponds to the phone number to the new name.

14. The system of claim 12, comprising:
based on the calling history that indicates previous telephone calls from the phone number and the identification data of the user, updating the caller identification information storage to include data indicating that the server verified the new name.

15. The system of claim 12, wherein:
determining whether to change the current name that corresponds to the phone number in the caller identification information storage from the current name to the new name comprises determining to bypass changing the current name that corresponds to the phone number to the new name, and
the method comprises providing, for output to the computing device, data indicating that the server will not change the current name corresponds to the phone number to the new name.

16. The system of claim 12, wherein the actions comprise:
determining, by the server, a confidence value that indicates the phone number belongs to the new name;
determining, by the server, a threshold confidence value for the new name; and
comparing the threshold confidence value to the confidence value,
wherein determining whether to change the current name that corresponds to the phone number in the caller identification information storage from the current name to the new name is based on comparing the threshold confidence value to the confidence value.

17. The system of claim 12, wherein the actions comprise:
determining time periods that devices that correspond to the phone number have previously placed telephone calls,
wherein determining whether to change the current name that corresponds to the phone number in the caller identification information storage from the current name to the new name is based on the time periods that devices that correspond to the phone number have previously placed telephone calls.

18. The system of claim 12, wherein the actions comprise:
determining an amount of time that has elapsed since a device that corresponds to the phone number has previously placed a telephone call,
wherein determining whether to change the current name that corresponds to the phone number in the caller identification information storage from the current name to the new name is based on the amount of time that has elapsed since a device that corresponds to the phone number has previously placed a telephone call.

19. The system of claim 12, wherein the actions comprise:
determining previous names that have corresponded to the phone number,
wherein determining whether to change the current name that corresponds to the phone number in the caller identification information storage from the current name to the new name is based on the previous names that have corresponded to the phone number.

20. One or more non-transitory computer-readable media of a computing device storing computer-executable instructions that upon execution cause one or more computers to perform acts comprising:

receiving, by a server and from a user of a computing device, data indicating a request to change a current name that corresponds to a phone number in a caller identification information storage from the current name to a new name, wherein the caller identification information storage is configured to (i) receive a given phone number of a given calling phone during placement of a given telephone call from the given calling phone to a given callee phone and (ii) output a given name that corresponds to the given phone number of the given calling phone for the given callee phone to output, based on given contacts information associated with the given callee phone not including given name data for the given phone number, on a given display while the given callee phone is outputting a given notification of the given telephone call;

accessing, by the server, a calling history that indicates previous telephone calls placed from the phone number;

accessing, by the server, identification data of the user;

based on the calling history that indicates previous telephone calls placed from the phone number and the identification data of the user, determining whether to change the current name that corresponds to the phone number in the caller identification information storage from the current name to the new name;

receiving, by the server, data indicating placement of a telephone call from the phone number to a callee phone;

in response to receiving the data indicating placement of the telephone call from the phone number, identifying, by the server, a name that corresponds to the phone number and that is the current name or the new name by accessing the caller identification information storage; and providing, for output by the server and to the callee phone, (i) data indicating a notification of the telephone call and (ii) the name that is the current name or the new name and data indicating that the name corresponds to the phone number.

* * * * *